United States Patent

[11] 3,617,846

| [72] | Inventor | Sanford M. Hanberg<br>Morton Grove, Ill. |
|---|---|---|
| [21] | Appl. No. | 889,195 |
| [22] | Filed | Dec. 30, 1969 |
| [45] | Patented | Nov. 2, 1971 |
| [73] | Assignee | Bell & Howell Company<br>Chicago, Ill. |

[54] DC MOTOR PROJECTOR DRIVE SYSTEM
4 Claims, 1 Drawing Fig.

[52] U.S. Cl.................................................. 318/341,
318/332
[51] Int. Cl...................................................... H02p 5/16
[50] Field of Search........................................ 318/313,
318, 330, 346, 332, 347, 349

[56] References Cited
UNITED STATES PATENTS

| 3,475,672 | 10/1969 | Oltendorf...................... | 318/349 |
| 3,008,075 | 11/1961 | Scott............................. | 318/318 |
| 3,689,661 | 5/1963 | Nieuweboer.................. | 318/318 |
| 3,313,994 | 4/1967 | Haydon......................... | 318/330 |

*Primary Examiner*—T. E. Lynch
*Assistant Examiner*—Thomas Langer
*Attorneys*—William F. Pinsak and William K. Serp ABSTRACT: Drive system for operating a motion picture projector in synchronism with a sound reproducing unit in which a DC motor is connected to an unregulated DC voltage-supply source through a voltage-dropping device which is controlled through a first regulator circuit from a speed control signal and which is controlled through a second regulator circuit to regulate the maximum adjusted DC motor voltage. During silent operation, the first regulator circuit is inactive and the second regulator circuit is adjustable to adjust DC motor speed. During sound reproduction, the second regulator circuit is set at a relatively high voltage position (free run maximum speed). In both operations, the effect of changes in supply voltage and other variables is minimized to stabilize operation.

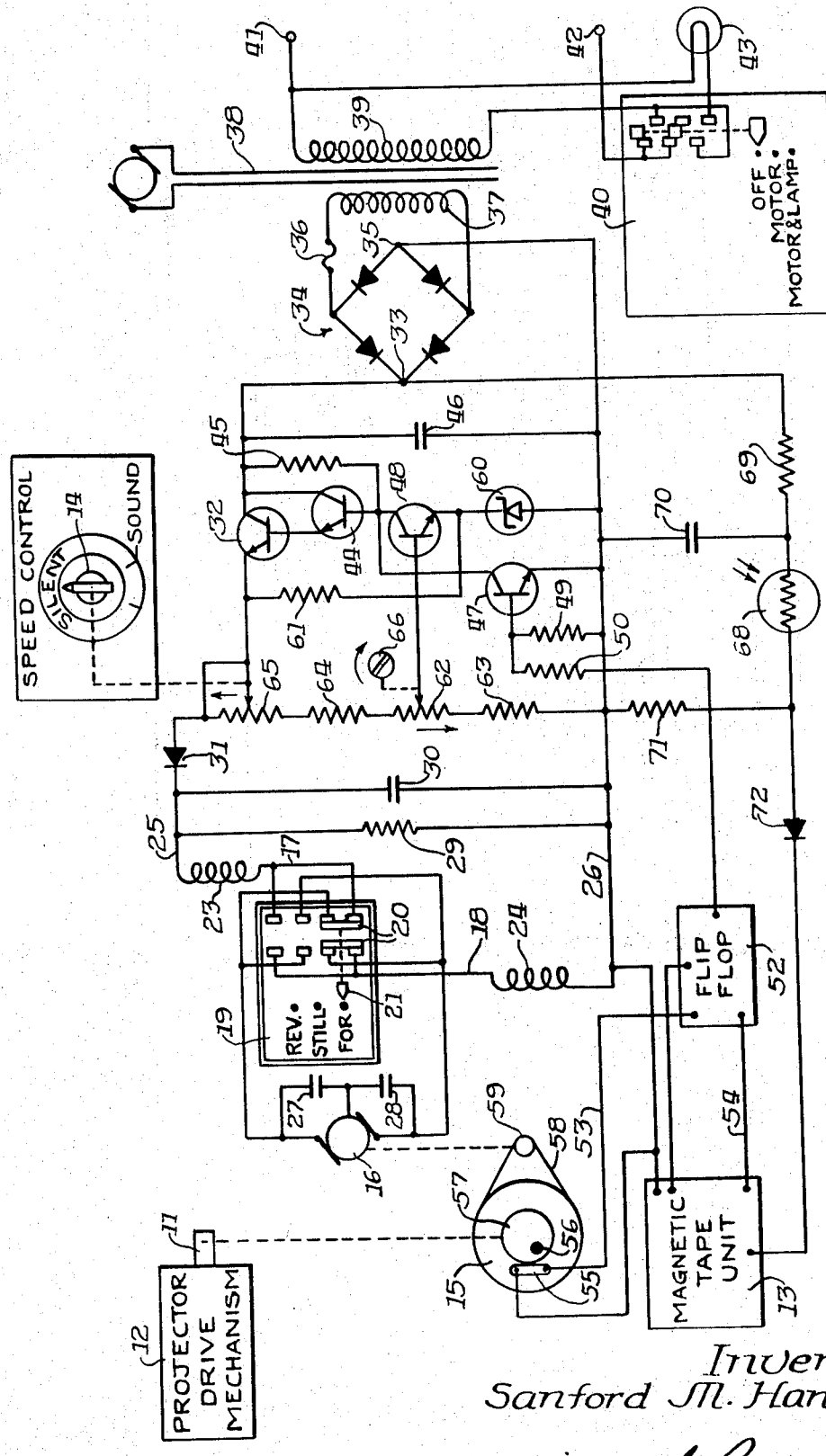

DC MOTOR PROJECTOR DRIVE SYSTEM

This invention relates to a drive system for synchronized motion picture projectors and more particularly to a system in which speed is accurately and efficiently controlled and in which a high degree of stability and reliability is obtained despite variations in supply voltage and other operating conditions. The system is relatively simple and uses a minimum number of component parts.

The system of this invention has other applications but was especially designed for and is particularly advantageous in motion picture projector systems in which sound is recorded on a magnetic tape during exposure of successive film frames in a camera, the sound being reproduced from the magnetic tape when the film, after having been developed, is transported through a projector. To avoid the necessity of attempting to move the film and tape at exactly constant speeds during both recording and reproduction, reference speed signals from the camera may be recorded on the magnetic tape and, during reproduction, such signals are used to control the speed of the projector, in order to synchronize the projection of the film with the sound reproduction.

This invention relates particularly to a type of system in which energization of a DC electric drive motor is controlled from a reference speed signal. Prior systems of this type have had disadvantages including the fact that with fluctuations in supply voltage and other variables, the speed cannot be accurately controlled. Conventional types of voltage-regulator circuits might be used but they are relatively expensive and inefficient.

This invention was evolved with the general object of overcoming the disadvantages of prior systems and providing a relatively simple and inexpensive system which is effective with high reliability and stability to efficiently and accurately control speed.

According to this invention, an electric drive motor is connected to an unregulated voltage-supply source through a voltage-dropping device which is controlled through a first regulator circuit from a speed control signal and which is controlled through a second regulator circuit to regulate the maximum adjusted DC motor voltage. With this arrangement, the effect of variations in supply voltage and of other variables is minimized without requiring complex and expensive circuitry, the voltage-dropping device being operative to both regulate speed and voltage.

In accordance with an important feature of the invention, the speed regulator means comprises means for periodically increasing the voltage-dropping device voltage to maximum with the time percentage of minimum voltage of the voltage-dropping device being controlled in response to the speed control signal. During operation of the voltage-dropping device, its voltage drop is controlled by the voltage-regulator means and thus the effect of variations in operating conditions on the speed-regulating operation is minimized.

In accordance with a specific feature of the invention, the speed control signal is developed by means of a flip-flop triggered to a reset condition by pulses developed in response to rotation of an operating shaft and triggered to a set condition in response to reference signal pulses. The reference signal pulses, in the case of a synchronized motion picture projector system, are supplied from a magnetic tape unit.

Another important feature relates to the manual control of speed when the automatic speed-regulator circuit is inactive. In accordance with this feature, the automatic voltage-regulator circuit is adjustable to adjust the regulated voltage value and to obtain any desired speed within a certain range, irrespective of variations in supply voltage and other variables. When the speed-regulator circuit is active, the regulated voltage value is adjusted to a maximum. This arrangement is especially advantageous in motion picture projector systems designed for both sound and silent operation.

Additional features of the invention relate to circuit arrangements for achieving the speed and voltage-regulating operations in a highly accurate and efficient manner while using a minimum number of component parts and while being relatively inexpensive, and while being very stable and reliable.

This invention contemplates other objects, features and advantages which will become more fully apparent from the following detailed description taken in conjunction with the accompanying drawing in which:

The single FIGURE is a schematic diagram of a projector drive system constructed in accordance with the principals of the invention.

Referring to the single drawing, a motion picture projector drive system is illustrated which is constructed in accordance with the principles of this invention. In the system illustrated, an operating shaft 11 of a film projector drive mechanism 12 may be driven in synchronism with reference speed signals reproduced from magnetic tape by a magnetic tape unit 13, such reference speed signals having been previously recorded on the magnetic tape during exposure of the film in a camera. The unit 13 reproduces reproduces sound previously recorded on the tape during operation of the camera and with the system illustrated, the film projection and sound reproduction are synchronized.

The system is also adapted for conventional silent film projection and in such operation, the speed may be adjusted over a relatively wide range by means of an adjustment knob 14.

As diagrammatically indicated, the shaft 11 is driven by shutter pulley 15 via motor pulley 59 and DC motor 16, which is connected to a pair of lines 17 and 18 through a slide switch 19 having a pair of slide contacts 20, the movement of which is controllable by a control knob 21. Knob 21 is movable to allow the user to select forward, still or reverse film speeds by applying the proper polarity of DC voltage to the motor 16 or applying no voltage thereto.

Lines 17 and 18 are connected through a pair of inductors 23 and 24 to lines 25 and 26. INductors 23 and 24 and a pair of capacitors 27 and 28, connected between brush terminals of the motor 16 and the frame thereof, form a filter which suppresses radiofrequency interference generated from the motor 16.

A resistor 29 is connected between lines 26 and 25 and serves to brake the motor 16 at certain times, as hereinafter described. The capacitor 30 is also connected between lines 25 and 26 and serves to suppress high-frequency "hash" which may be developed in the regulator circuitry.

To supply voltage to the lines 25 and 26 and thus to the motor 16, line 25 is connected through a diode 31 to the emitter of a transistor 32 the collector of which is connected to a positive output terminal 33 of a bridge rectifier 34 having a negative output terminal 35 connected to the line 26. INput terminals of bridge rectifier 34 are connected through a fuse 36 to a secondary winding 37 of a transformer 38 having a primary winding 39 connectable through a slide switch 40 to power input terminals 41 and 42 which are connected to a suitable AC supply source such as source of 120 volt 60 Hertz current. Switch 40 also controls energization of a projector lamp 43 and has three positions, an "off" position, a second position in which only the winding 39 is connected to terminals 41 and 42 and a third position in which both the windings 39 and the lamp 43 are connected to the terminals 41 and 42.

To reduce expense, the transformer 38 may preferably be formed as the field structure of a shaded pole motor (motor former) which drives a fan for cooling of the projector lamp 43. It will be appreciated that the voltage applied to lines 41 and 42 is unregulated and subject to considerable variation. With the proper values of circuit components, the circuit of this invention can automatically regulate speed within a line voltage between 105 and 135 volts.

The transistor 32 is a power transistor and forms a voltage-dropping device which may also include a second transistor 44 connected to the transistor 32 with a Darlington arrangement, the emitter and collector electrodes of the transistor 44 being connected to the base and collector electrodes of the transistor 32. Both transistors 32 and 44 may be in a common case. It will be understood that a single transistor having the proper characteristics may be used in place of the two transistors 32 and 44.

The base of the transistor 44 is connected through a resistor 45 to the positive output terminal 33 of the bridge rectifier 34, it being here noted that a filter capacitor 46 is preferably connected across the output of the rectifier 34. The base of transistor 44 is also connected to the collectors of two control transistors 47 speed-regulating 48. The transistor 47 forms part of a speed-regulating circuit while the transistor 48 forms part of a voltage-regulating circuit.

Considering first the operation of the speed-regulating circuit, the emitter of the transistor 47 is connected to the line 26 while the base thereof is connected through a resistor 49 to the line 26 and through a resistor 50 to the output of a flip-flop 52 which is triggered to a reset condition in response to pulses applied through a line 53 and developed in response to rotation of the shaft 11 and which is triggered to a set condition by pulses applied through a line 54 from the magnetic tape unit 13. Line 53 is connected through a magnetic reed switch 55 to the line 26. Switch 55 may comprise a vane or vanes of magnetic material and is mounted in proximity to the path of rotation of a magnet 56 on a magnet wheel 57 which is attached to shutter pulley 15 coupled through a belt 58 to a pulley 59 coupled to the motor 16 and shaft 11.

In operation, pulses applied through the line 54 from the tape unit 13 place the flip-flop 52 in its set condition and the potential of the output thereof is then about equal to or less than that of the line 26, such that the transistor 47 does not conduct and the transistors 44 and 32 are allowed to conduct to an extent determined by the operation of the voltage-regulating transistor 48. A voltage is then applied to the motor 16 to cause it to drive the shaft 11 and as pulses are developed by the reed switch 55, the flip-flop 52 is periodically reset. In the reset condition of the flip-flop 52, the output thereof is at a positive potential relative to that of the line 26 and the transistor 47 is caused to conduct to an extent sufficient to drop the potential of the base of the transistor 44 below that of the emitter thereof, and to cut off conduction through both the transistor 44 and the transistor 32. THe motor 16 is then braked, the voltage developed by the motor 16 being applied to the resistor 29. After deceleration of the motor 16 to a certain speed, the set and reset pulses are applied at the same rate and the current is applied to the motor 16 a certain percentage of the time. Preferably, the current may be applied about 50 percent of the time during average conditions and in response to increases or decreases in the rate of the pulses applied from the unit 13 or in response to changes in load conditions, the percentage of time of application of the current is changed automatically to apply the proper drive and to maintain synchronized operation. By way of example, the automatic control may be maintained through a film speed range of from 15 to 20 frames per second.

It is an important feature of the invention that the voltage applied to the motor 16 during conduction of the transistor 32 is regulated by means of the transistor 48, i irrespective of variations in the supply voltage, variations in the characteristics of the transistor 32 and other variations in operating conditions. To achieve such voltage regulation, emitter of the transistor 48 is connected through a zener diode 60 to the line 26 and may also be connected through a resistor 61 to the emitter of the transistor 32, the combined current flow through transistor 48 and resistor 61 being sufficient to produce a constant reference voltage across the zener diode 60. The base of the transistor 48 is connected to the movable contact of a potentiometer 62 having one terminal connected through a resistor 63 to the line 26 and having its other terminal connected through a resistor 64 and potentiometer 65 to the emitter of transistor 32. THe movable contact of potentiometer 65 is also connected to the emitter of transistor 32 and is mechanically coupled to the control knob 14.

In operation, if the output voltage, developed between line 26 and the emitter of transistor 32, increases, the potential of the base of the transistor 48 increases relative to the potential of the emitter thereof, regulated by zener diode 60, and conduction of transistor 48 increases to reduce conduction of the transistor 44 and to thereby reduce conduction of the transistor 32 and to lower the output voltage. If the output voltage should decrease, a reverse effect takes place. As a result, the output voltage is regulated to within very narrow limits.

During automatic speed control, the control knob 14 is moved to a "Sound" position at which time, the movable contact of the potentiometer 65 is at the end of the resistance element thereof connected to the emitter of the transistor 32, so that maximum resistance is provided. As a result, a maximum regulated voltage is developed. The average voltage is, of course, determined by the percentage of time the transistor 32 is conductive.

When the automatic speed control circuitry is inactive, i.e. during "silent" operation, the speed may be adjusted by rotation of the knob 14, the resistance of potentiometer 65 being adjustable from 0 to its maximum value. As a result, any desired speed may be obtained within a certain range and once a setting is made, the set speed will be automatically maintained through the operation of the voltage-regulating circuitry. By way of example, the user may select any film speed between 12 and 22 frames per second.

The potentiometer 62 is adjustable by factory personnel, by adjustment of an adjustment screw 66 diagrammatically illustrated, to obtain the proper maximum free film speed of the projector when the potentiometer 65 is in the "sound" or maximum resistance position. Resistor 64 limits the lowest free run film speed obtainable while resistor 63 limits the highest free run film speed obtainable.

The system as illustrated further includes means for automatically initiating operation of the automatic speed control circuitry. In the operation of the camera during exposure of the film when sound is recorded, a transparent area on the film is produced which indicates the commencement of sound scene and, after developing, the transparent area is sensed by a photocell circuit including a photocell 68. One terminal of photocell 68 is connected through a resistor 69 to the positive output terminal 33 of the rectifier 34 and through a capacitor 70 to the line 26. The other terminal thereof, is connnected through a resistor 71 to the line 26 and through a diode 72 to the magnetic tape unit 13. In operation, when the transparent film area passes between the photocell 68 and a suitable light source not shown, the resistance of the photocell 68 is reduced from a relatively high value to a low value and the capacitor 70 discharges current through photocell 68 and diode 72 to the magnetic tape unit 13. The current flow through the photocell 68 triggers a circuit in the magnetic tape unit 13 to initiate operation thereof. Resistor 69 limits the photocell current and minimizes photocell dissipation during time periods when the photocell is constantly sensing projection lamp illumination and thus exhibits a low resistance over a long period of time. Capacitor 70 is charged through the resistor 69 to the unregulated DC supply voltage across capacitor 46 during photocell nonsensing periods. Resistor 71 and the diode 72 minimize the current applied to the magnetic tape unit 13 during photocell nonsensing periods.

By way of illustrative example and not by way of limitation, the circuit elements may have values or may be of types according to the following table:

| Reference Numeral | Value or Type |
| --- | --- |
| 29 | 220 ohms |
| 30 | 1 microfarad |
| 32 | Type 2N 5294 |
| 44 | Type 2N 5294 |
| 45 | 1,800 ohms |
| 46 | 1,000 microfarads |
| 47, 48 | Type 2N 3415 |
| 49 | 22,000 ohms |
| 50 | 27,000 ohms |
| 60 | Type 1N 751A (5.1 volts) |
| 61 | 820 ohms |
| 62 | 1,000 ohms |

| | | |
|---|---|---|
| | 63 | 1,800 ohms |
| | 64 | 1,000 ohms |
| | 65 | 2,500 ohms |
| | 69 | 15,000 ohms |
| 70 | | 50 microfarads |
| | 71 | 1,800 ohms |

The motorformer 38 may supply 28 volts AC at 0.7 amperes.

It will be understood that modifications and variations may be effected without departing form the spirit and scope of the normal concepts of this invention,

What is claimed is:

1. In a system including an operating shaft to be rotated in accordance with an intermittently operable pulsed reference signal at a speed within a certain range, sensing means arranged to develop an output speed signal corresponding to the speed of rotation of said operating shaft, comparison means responsive to said reference signal during operable periods and to said output speed signal and arranged to develop a control signal corresponding to the difference between said reference signal and output speed signal, a power input circuit arranged for connection to an electrical power source subject to voltage variations, a load circuit including an electric motor for driving said shaft, a load voltage dropping device in series between said power input circuit and said load circuit, first regulating means responsive to said control signal and arranged to control said load voltage dropping device to control voltage to said motor and to oppose changes in said output speed signal relative to said reference signal, and second regulating means responsive to the load circuit voltage applied to said load circuit during inoperative periods, and arranged to oppose changes in load circuit voltage away from a regulated value, and to control the speed of said operating shaft in the absence of said reference signal, said reference signal being in the form of periodic pulses at a rate corresponding to the desired speed of rotation of said operating shaft, said output speed signal being in the form of periodic pulses at of rate corresponding to the actual speed of rotation of said operating shaft, said comparison means comprising a flip-flop triggered to a reset condition by said output speed signal pulses and to a set condition in response to said reference signal pulses and said first regulating means comprising means for cutting off conduction of said voltage dropping device in said reset conditions of said flip-flop.

2. In a system as defined in claim 1, said electric motor being a DC motor, and said load voltage-dropping device including a power transistor, unidirectional conduction means in series with said motor to prevent application of the back EMF of said motor to said power transistor.

3. In a system defined in claim 1, a motion picture projector film drive mechanism driven by said operating shaft, a tape unit for developing sound to accompany film driven by said drive unit and arranged to supply said reference signal, said first regulating means comprising means for periodically rendering said voltage-dropping device nonconductive with the percentage of time of conduction of said control device being controlled in accordance with said control signal, and photocell means for sensing control marks on film driven by said film guide mechanism for rendering said first regulating means operable during reproduction of sound by said tape unit and inoperable during silent film projection.

4. In system as defined in claim 3, manual adjustment means for manually adjusting said second regulating means to adjust said regulated value of load silent voltage and to obtain a selected film speed during silent film projection, said manual adjustment means being set at a maximum voltage position when said first regulating means is rendered operable during sound projection.

* * * * *